(12) United States Patent
Hottinen et al.

(10) Patent No.: US 6,996,190 B2
(45) Date of Patent: Feb. 7, 2006

(54) METHOD OF ENCODING A SIGNAL, TRANSMITTER AND RECEIVER

(75) Inventors: Ari Hottinen, Espoo (FI); Olav Tirkkonen, Helsinki (FI)

(73) Assignee: Nokia Corporation, Espoo (FI)

(*) Notice: Subject to any disclaimer, the term of this patent is extended or adjusted under 35 U.S.C. 154(b) by 334 days.

(21) Appl. No.: 10/179,007

(22) Filed: Jun. 26, 2002

(65) Prior Publication Data

US 2003/0016759 A1 Jan. 23, 2003

Related U.S. Application Data

(63) Continuation of application No. PCT/FI00/01132, filed on Dec. 21, 2000.

(30) Foreign Application Priority Data

Dec. 27, 1999  (FI) .............................................. 19992790

(51) Int. Cl.
*H04L 1/02* (2006.01)
*H04L 27/36* (2006.01)
*H04L 27/02* (2006.01)

(52) U.S. Cl. ...................... 375/267; 375/299; 375/347; 375/298

(58) Field of Classification Search ................. 375/267, 375/347, 295, 316, 260, 261, 279, 280, 298, 375/299, 308, 329, 331, 340; 329/304; 455/101, 455/102; 332/103
See application file for complete search history.

(56) References Cited

U.S. PATENT DOCUMENTS 5,926,500 A    7/1999  Odenwalder
6,424,642 B1 *  7/2002  Schmidl et al. ............. 370/342
6,724,828 B1 *  4/2004  Dabak ......................... 375/267
6,804,311 B1 * 10/2004  Dabak et al. ................ 375/347
6,807,240 B2 * 10/2004  Alamouti et al. ........... 375/341

FOREIGN PATENT DOCUMENTS

| WO | WO 99/04519 | 1/1999 |
| WO | WO 99/14871 | 3/1999 |

OTHER PUBLICATIONS

Ikeda et al., "The performance of adaptive modulation with dynamic channel assignment in multimedia traffic," IEEE 1998 International Conference on Universal Personal Communications, vol. 1, pp. 523–527.

Hottinen et al., "A Flexible Multirate CDMA Concept with Multiuser Detection," IEEE International Symposium on Spread Spectrum Techniques and Applications, 1996, vol. 2, pp. 556–560.

Stefanov et al., "Turbo Coded Modulation for Systems with Transmit and Receive Antenna Diversity," Global Telecommunications Conference, 1999, vol. 5, pp. 2336–2340.

(Continued)

*Primary Examiner*—Tesfaldet Bocure
(74) *Attorney, Agent, or Firm*—Pillsbury Winthrop Shaw Pittman LLP

(57) ABSTRACT

The invention relates to a method of encoding a digital signal, to a receiver and to a transmitter including mechanisms for encoding symbols, including bits, in blocks of a given length, mechanism for encoding each block into a given number of channel symbols to be transmitted over several separate channels, and at least three transmit antenna paths for transmitting the channel symbols. In the solution of the invention, the transmitter converts the symbols into a form in which the sum energy of channel symbols mapping at least one symbol in a block is higher than the sum energy of channel symbols mapping another symbol in the block.

48 Claims, 4 Drawing Sheets

OTHER PUBLICATIONS

Correia et al., "Complex Constellations for WCDMA with Transmitter Diversity," 2000 IEEE Sixth International Symposium on Spread Spectrum Techniques and Applications, vol. 2, pp. 439–443.

Tirkkonen et al., "Complex Space–Time Block Codes for Four Tx Antennas," IEEE Global Telecommunications Conference 2000, vol. 2, pp. 1005–1009.

Le Goff et al., :Turbo–Codes and High Spectral Efficiency Modulation, IEEE Int. Conf. Super Comm. Proceedings ICC 1994, vol. 2, pp. 645–649.

Gucy et al., "Signal Design for Transmitter Diversity Wireless Communication Systems Over Rayleigh Fading Channels," IEEE $46^{th}$ Vehicular Technology Conference, 1996, pp. 136–140.

Tarokh et al., "Space–Time Block Coding for Wireless Communications: Performance Results," IEEE Journal on Selected Areas in Communications, vol. 17, No. 3, Mar. 1999, pp. 451–460.

\* cited by examiner

| $S_1$ $S_2$ | $S_3$ | CODE RATE |
|---|---|---|
| QPSK | 8-PSK | 7/8 |
| | 16-QAM | 7 |
| | 16-PSK | 1 |
| | 8-PAM-PSK | 7/8 |

Fig. 4a

| $S_1$ $S_2$ | $S_3$ | CODE RATE |
|---|---|---|
| 8-PSK | 16-PSK | 5/6 |
| | 16-QAM | 5/6 |

Fig. 4b

METHOD OF ENCODING A SIGNAL, TRANSMITTER AND RECEIVER

This application is a continuation of international application PCT/FI00/01132 filed on the 21st of Dec. 2000, which designated the U.S. and was published under PCT Article 21(2) in English.

FIELD OF THE INVENTION

The invention relates to a transmitter and a method of encoding a digital signal, wherein symbols to be transmitted are encoded in blocks of a given length. The invention relates particularly to a method of transmitting a signal over three or more antennas.

BACKGROUND OF THE INVENTION

On telecommunication connections, the transmission path used for transmitting signals is known to cause interference to telecommunication. This occurs irrespective of the physical form of the transmission path, whether the transmission path is e.g. a radio link, an optical fibre or a copper cable. Particularly in radio communication, situations often arise when the quality of the transmission path varies from one connection to another and during a connection.

Fading on a radio path is a typical phenomenon causing changes in a transmission channel. Other simultaneous connections may also cause interference, which may change as a function of time and place.

In a typical radio communication environment, signals between a transmitter and a receiver propagate along several paths. This multipath propagation is mainly caused by the signal being reflected from surrounding surfaces. Signals that propagate along different paths arrive at the receiver at different times due to a different propagation delay. Different methods have been developed to compensate for the fading caused by said multipath propagation.

One of the most efficient ways to compensate for fading on the radio path is adjustment of the transmission power of the transmitter. If the characteristics of the radio path are known, the power of the transmitter can be adjusted so as to cancel the effect of fading. However, in practice, such a solution is not easy to implement since, firstly, the transmitter should be aware of the quality of the channel, and real-time transmission of this information to the transmitter is difficult. Secondly, the transmission power limits set for transmitters and the dynamic ranges of transmitters bring about restrictions. Furthermore, power adjustment may itself result in inefficient transmission by increasing the power high in fade gaps.

A solution to the problem is to use diversity in the transmitter. In time diversity, interleaving and encoding are used to achieve time-based diversity in the signal to be transmitted. However, a drawback here is delays in transmission, especially when the channel is slowly fading. In frequency diversity, in turn, the signal is transmitted simultaneously at several frequencies. However, this is an inefficient method when the channel has a wide coherence bandwidth.

In transmission antenna diversity, the same signal or the different parts of the same signal are transmitted to a receiver over two or more antennas. Hereby the signal components that have multipath propagated through different channels are probably not interfered with by a simultaneous fade.

Publication WO 99/14871 discloses a diversity method wherein symbols, composed of bits, to be transmitted are encoded in blocks of a given length, and each block is encoded into a given number of channel symbols to be transmitted over two antennas. A different signal is transmitted over each antenna. For example, when bits to be encoded are split into two-bit blocks, the channel symbols to be transmitted are so formed that the channel symbols to be transmitted over the first antenna are composed of a first symbol and the complex conjugate of a second symbol, and the channel symbols to be transmitted over the second antenna are composed of the second symbol and the complex conjugate of the first symbol. However, the solution is presented only for use with two antennas.

Tarokh, V., Jafarkhani, H., Calderbank, A. R.: *Space-Time Block Coding for Wireless Communication: Performance Results*, IEEE Journal on Selected Areas in Communication, Vol. 17 pp. 451 to 460, March 1999, in turn, discloses similar solutions applicable to more than two antennas. The publication discloses an encoding method, which achieves full diversity at a ¾ code rate with four antennas.

Four desirable characteristics can be presented for what is known as open-loop-diversity:

1. Full diversity in relation to the number of antennas.
2. Only linear processing required in transmitter and receiver.
3. Transmission power is evenly divided among antennas.
4. As high code rate efficiency as possible.

The drawback in the solution presented above is that only 1 and 2 of the above-indicated prerequisites are realized. For example, the transmission powers of the different antennas are unevenly distributed, i.e. the different antennas transmit at different powers. This causes problems for the design of terminal amplifiers. Furthermore, the code rate is not optimal.

BRIEF DESCRIPTION OF THE INVENTION

The object of the invention is thus to provide a method and equipment for implementing the method so as to implement diversity as advantageously as possible. This is achieved by a method of encoding a digital signal, the method comprising encoding symbols, composed of bits, to be transmitted in blocks of a given length, and encoding each block into a given number of channel symbols to be transmitted over several separate channels and three or more transmit antenna paths. The method of the invention comprises encoding the symbols so that the sum energy of channel symbols mapping at least one symbol in a block is higher than the sum energy of channel symbols mapping another symbol in the block.

The invention also relates to a transmitter comprising means for encoding symbols, composed of bits, to be transmitted in blocks of a given length, means for encoding each block into a given number of channel symbols to be transmitted over several separate channels, and at least three transmit antenna paths for transmitting the channel symbols. The transmitter of the invention comprises means for converting the symbols into a form in which the sum energy of channel symbols mapping at least one symbol in a block is higher than the sum energy of channel symbols mapping another symbol in the block.

The invention also relates to a receiver comprising a decoder, a combiner and a detector, the receiver being adapted to receive a signal in which symbols composed of bits are encoded in blocks of given lengths into a given number of channel symbols. The receiver comprises a decoder, a combiner and a detector, arranged to combine and detect a signal in which the sum energy of channel symbols mapping at least one symbol in a block is higher than the sum energy of channel symbols mapping another symbol in the block.

Preferred embodiments are described in the dependent claims.

In a preferred embodiment of the invention, at least one symbol in a block is modulated by a different method than another symbol in the block. For example, if the size of a block is three symbols, two symbols are achieved using the QPSK-symbol alphabet and one symbol using the 8-PSK-symbol alphabet. This accomplishes full diversity at a 7/8 code rate. If two symbols are achieved using the QPSK-symbol alphabet and one using the 16-QAM-symbol alphabet, the resulting code rate is one.

In a second preferred embodiment of the invention, at least one symbol in a block has a higher, reliability than another symbol in the block. This way the symbols can also be transmitted using the same symbol alphabet.

The solution of the invention also accomplishes even distribution of transmission power among the different antennas.

The invention can be implemented multifariously such that the obtained channel coded symbols are transmitted over three or more antennas at different frequencies, in different timeslots or encoded with different spreading codes.

BRIEF DESCRIPTION OF THE FIGURES

In the following, the invention will be described in detail in connection with preferred embodiments with reference to the accompanying drawings, in which FIGS. 4a and 4b illustrate state diagrams of different modulation methods.

DETAILED DESCRIPTION OF THE INVENTION

The invention is usable in radio systems allowing the transmission of at least part of a signal over at least three or more transmit antennas. A transfer channel may be composed for example by using time division, frequency division or code division symbol multiplexing or a multiple access method. System according to the invention also include systems using combinations of different multiple access methods. The examples describe the use of the invention in a universal mobile telephone system using a wideband code division multiple access method implemented by the direct sequence technique, without, however, restricting the invention thereto.

The structure of a mobile telephone system will be described by way of example with reference to FIG. 1. The main parts of a mobile telephone system include a core network CN, an UMTS terrestrial radio access network UTRAN and user equipment UE. The interface between the CN and the UTRAN is called Iu, and the air interface between the UTRAN and the UE is called Uu.

The UTRAN is composed of radio network subsystems RNS. The interface between RNSs is called Iur. The RNS is composed of radio network controllers RNC and one or more nodes B. The interface between the RNC and a B is called Iub. The coverage area of node B, i.e. a cell, is denoted by C in the figure.

Figure 1:
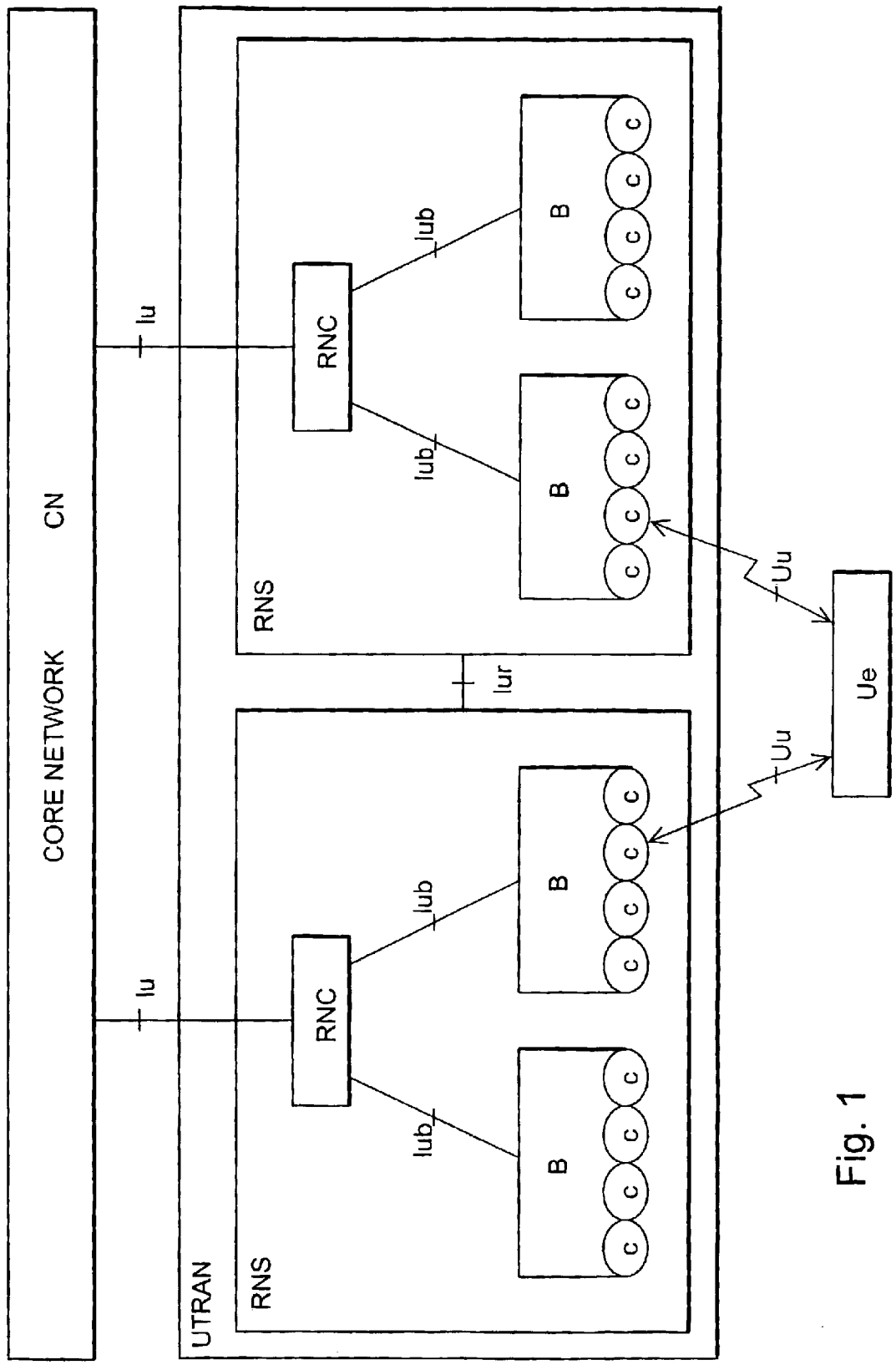
FIG. 1 shows an example of a system according to an embodiment of the invention.
Figure 2:
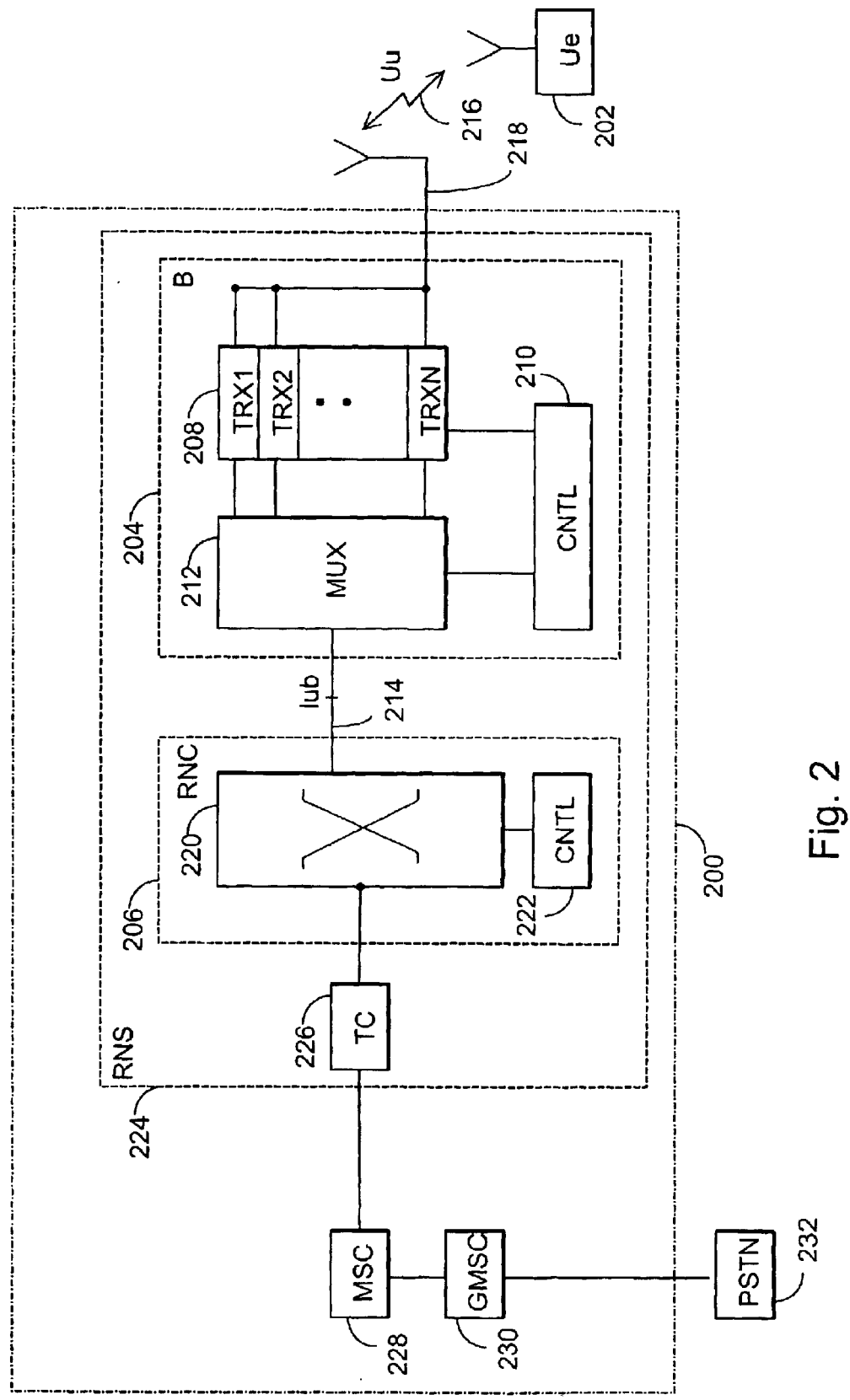
FIG. 2 shows another example of a system according to an embodiment of the invention.

The presentation in FIG. 1 is on a quite general level, and it is therefore clarified by a more specified example of a cellular radio system in FIG. 2. FIG. 2 only comprises the most essential blocks, but it is apparent to a person skilled in the art that a conventional cellular radio network also comprises other functions and structures that need not be described in detail herein. It should also be noted that FIG. 2 only shows an exemplary structure. In the systems of the invention, the details may differ from those shown in FIG. 2, but these differences are irrelevant to the invention.

Thus, a cellular radio network typically comprises a fixed network infrastructure, i.e. a network part 200, and user equipment 202, which may be fixedly mounted, vehicle-mounted or portable hand-held terminals. The network part 200 comprises base stations 204. A base station corresponds to node B in the previous figure. A radio network controller 206 communicating with several base stations 204 controls them in a centralized manner. A base station 204 comprises transceivers 408 and a multiplexer unit 212.

A base station 204 further comprises a control unit 210 for controlling the operations of the transceivers 208 and the multiplexer 212. The multiplexer 212 is used to place the traffic and control channels used by several transceivers 208 on one transmission link 214. The transmission link 214 provides the interface Iub.

There is a connection from the transceivers 208 of the base station 204 to an antenna unit 218, which implements a bi-directional radio link 216 to the user equipment 202. The structure of frames transferred on the bi-directional radio link 216 is defined system-specifically, and it is called air interface Uu.

The radio network controller 206 comprises a group switching field 220 and a control unit 222. The group switching field 220 is used for switching speech and data and for connecting signalling circuits. The base station 204 and the radio network controller 206 form a radio network subsystem 224, which also comprises a transcoder 226. The transcoder 226 is usually located as close as possible to a mobile switching centre 228, since this allows speech to the transferred in the form of the cellular radio network between the transcoder 226 and the radio network controller 206, thus saving transfer capacity.

The transcoder 226 converts the different digital speech encoding forms used between the general telephone network and the radio telephone network so that they are suitable for one another, for example from the form of the fixed network to another form of the cellular radio network or vice versa. The control unit 222 attends to call control, mobility management, gathering of statistics, and signalling.

FIG. 2 also shows the mobile switching centre 228 and a port mobile switching centre 230, which attends to the connections of the mobile telephone system to the outside world, herein to a general telephone network 232.

Figure 3:
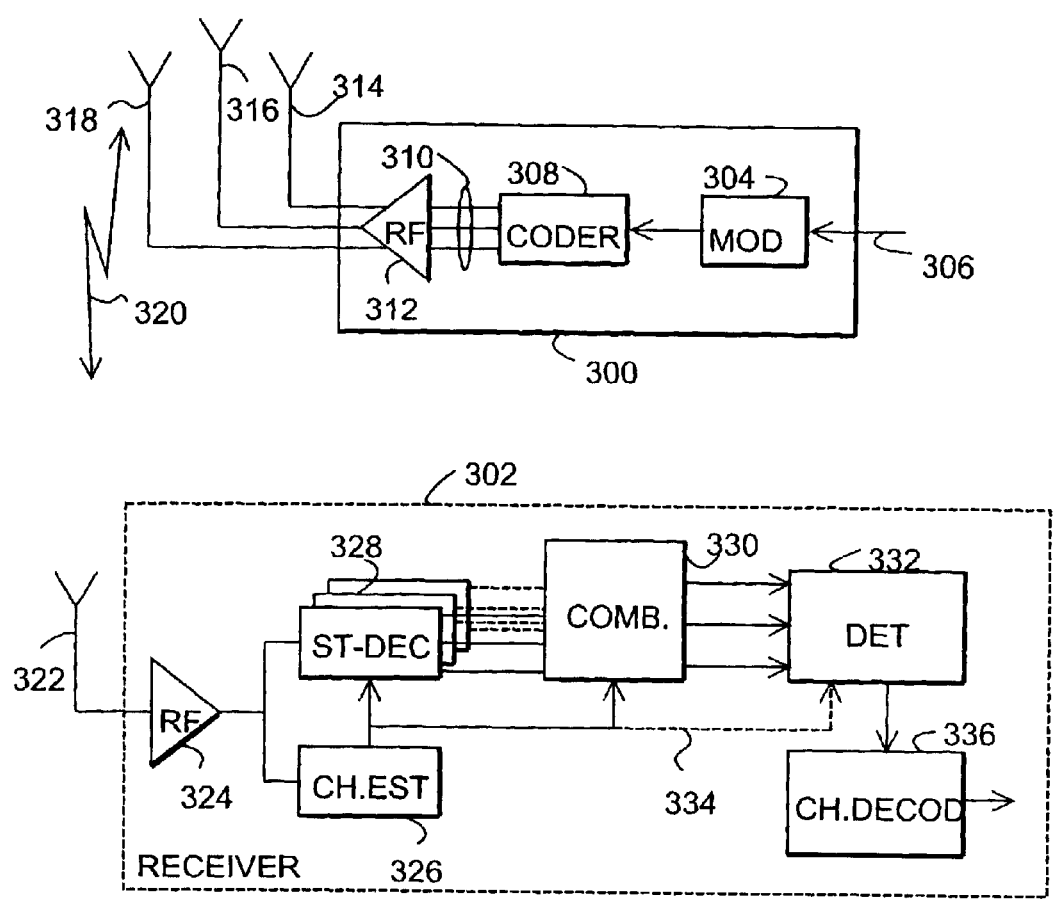
FIG. 3 illustrates an example of an arrangement according to an embodiment of the invention.

FIG. 3 illustrates an example of an arrangement according to an embodiment of the invention. The figure shows a situation wherein channel coded symbols are transmitted over three antennas in different timeslots. The figure first shows a transmitter 300, which communicates with a receiver 302. The transmitter comprises a modulator 304, to which a signal 306 to be transmitted is applied as input and which in the solution of a preferred embodiment is composed of bits. In the modulator, the bits are modulated into symbols. The symbols to be transmitted are grouped into blocks of a given length. Let us assume in this example that the length of a block is three symbols and that the symbols are s1, s2 and s3. The symbols are applied to an encoder 308. In the encoder, each block is encoded into n*m channel symbols, wherein n and m are positive integers. Channel symbols 310 are applied via radio frequency parts 312 for transmission over three antennas 314 to 318 in this example.

Three or more transmit antenna paths can be achieved by means of three or more antennas or by means of three or more antenna beams, which, in turn, are achieved using at least two antennas and-suitable phasing or complex weighting.

In the solution according to the present embodiment of the invention, bits are modulated into symbols in such a way that the sum energy of channel symbols mapping at least one symbol in a block is higher than the sum energy of channel symbols mapping another symbol in the block.

In the present example, a block comprises symbols s1, s2 and s3. Encoding is performed in the encoder $$(s1, s2, s3) \rightarrow \begin{bmatrix} s1 & s2 & s3 \\ -s2^* & s1^* & s3 \\ s3^* & s3^* & (-s1-s1^*+s2-s2^*)/2 \\ s3^* & -s3^* & (s2+s2^*+s1-s1^*)/2 \end{bmatrix} \quad (1)$$

wherein the asterisk (*) indicates a complex conjugate. When studying the encoded symbols, one observes that when the energies of the symbols (s1, s2, s3) are calculated over the encoded block, symbol s3 gets a three db higher energy than the others do. At the same time, substantially the same power is emitted from different antennas at the same points of time.

In accordance with a preferred embodiment of the invention, at least one symbol in a block has a higher reliability than another symbol in the block. A higher reliability is preferably obtained for the symbol the sum energy of the channel symbols mapping which is higher than that of other symbols. Thus, in this example, a higher reliability is obtained for symbol s3 than for symbols s1 and s2. Symbols s1, s2 and s3 are generated using some outer encoding, such as convolution or turbo encoding. When selecting the encoding and symbol modulation, symbol reliability is taken into account.

In accordance with a second preferred embodiment of the invention, at least one symbol in a block is modulated by a different modulation method than another symbol in the block, i.e. at least one symbol in the block belongs to a different symbol alphabet than another symbol in the block. A different modulation method, which contains more information, is preferably used for the symbol the sum energy of the channel symbols mapping which is higher than that of other symbols. Thus, the above symbols s1 and s2 can be selected to belong to the QPSK-symbol alphabet and symbol s3 to the 8-PSK-symbol alphabet. This yields a code rate of 7/8.

The table in FIG. 4a illustrates different modulation methods their state diagrams and obtainable code rates when s1 and s2 are selected to belong to the QPSK-symbol alphabet. When 8-PSK is selected as the modulation method for symbol s3, a code rate of 7/8 is obtained at full diversity. When 16-QAM, 16-PSK or 8-PAM-PSK is selected as the modulation method, the code rates are 1.1 and 7/8, respectively. Naturally, other methods may also be used, such as encoded modulation methods to increase spectral efficiency.

The table shown in FIG. 4b illustrates different modulation methods, their state diagrams and obtainable code rates when s1 and s2 are selected to belong to the 8-PSK-symbol alphabet. When 16-PSK is selected as the modulation method for symbol s3, a code rate of 5/6 is thus obtained. When 16-QAM is selected as the modulation method, the code rate is also 5/6.

In the solution of the present embodiment of the invention, bits are modulated into symbols in such a way that at least one symbol in a block comprises a different number of bits than another symbol in the block. In the present example, wherein symbols so and s2 are selected to belong to the QPSK symbol alphabet and symbol s3 to the 8-PSK-symbol alphabet, symbols s1 and s2 each comprise two bits and symbol s3 three bits. In a preferred alternative embodiment of the invention, some bits in the symbols comprising more bits are previously known. Thus, in this example, some bits in symbol s3 are previously known, i.e. they can be used for transmitting a pilot signal or a training sequence.

Thus, in the table of the above formula (1), the symbols are transmitted over three antennas in such a way that each column comprises the symbols to be transmitted over one antenna. Each horizontal line comprises the symbols to be transmitted in one timeslot. Thus, the first antenna transmits symbol s1 in a first timeslot, -s2* in a second timeslot, s3* in a third timeslot and s3* in a fourth timeslot.

The above solution brings about the advantage that the signal powers of symbols transmitted over each antenna are equal.

Besides using different timeslots, the channel-coded signals may also be transmitted at different frequencies or using different spreading codes.

If frequency division is in use, the table may be interpreted such that each horizontal line comprises the symbols to be transmitted at one frequency. Thus, the first antenna transmits symbol s1 at a first-frequency, -s2* at a second frequency, s3* at a third frequency and at the same time s3* at a fourth.

Similarly, if code division is in use, the table may be interpreted such that each horizontal line comprises symbols to be transmitted using one spreading code. Thus, the first antenna transmits symbol s1 using a first spreading code, -s2* using a second spreading code, s3* using third spreading code and at the same time s3* using a fourth.

The above describes, by way of example, encoding that results in a four-row three-column table. The invention can be applied in the same way when the encoding table has m rows and n columns, i.e. when each symbol block is encoded into n*m channel symbols to be transmitted over several separate channels and three or more antennas. Separate channels indicate for example a different timeslot, a different frequency or a different spreading code, i.e. the transmission method for achieving a different signal propagation path. There may be m separate channels, whereby n antennas are used, or n channels, when m antennas are used.

In a solution according to an embodiment of the invention, linear conversion is performed on the symbols before encoding. The linear conversion may conform for example with the following formula:

$$\begin{bmatrix} s1' \\ s2' \\ s3' \end{bmatrix} = A \begin{bmatrix} s1 \\ s2 \\ s3 \\ s4 \end{bmatrix}$$

wherein A is an arbitrary 3*4 matrix. At the transmitter, conversion may be implemented in the encoder 308 or, alternatively, in a separate unit before the encoder (not shown in FIG. 3). Code rates may also be increased by puncturing.

In a solution according to another embodiment of the invention, conversion is non-linear. In this case, for example, one waveform is selected with a given number of information bits from a three-dimensional complex space and the components of the multidimensional signal are transmitted over different antennas, or symbols s1, s2 and s3, block-encoded in accordance with the invention.

Let us study the receiver in FIG. 3 further. Thus, the transmitter of the invention is used to transmit a signal 320 using three or more antennas. The signal is received at the receiver 302 with an antenna 322 and applied to radio frequency parts 324. The number of receiver antennas is irrelevant to the invention. In the radio frequency parts, the signal is converted into an intermediate or base frequency. The converted signal is applied to a channel estimator 326, where estimates are generated for the channel through which the signal propagated. The estimates can be generated for example by means of previously known bits in the signal, such as by means of a pilot signal or a training sequence. From the radio frequency parts, the signal is applied to a decoder bank 328 comprising a number of decoder units that decode the encoding performed at the transmission end in the encoder 308. Since a signal transferred over the radio path often propagates along more than one path between the transmitter and the receiver, the received signal comprises several multipath components. Each decoder unit processes one received signal component. The decoder units receive the symbols transmitted in different timeslots, at different frequencies or using different spreading codes, typically store them temporarily in a buffer memory and generate estimates by means of channel estimates as original block symbols $\hat{s}_i$, i=1,2,3. The decoded symbols are applied from the decoder units to a combiner 330, where the signals of different paths are combined. The combiner may be implemented for example by the rake technique, using maximum ratio combination technique. Information on the estimated channel is applied from the channel estimator 326 to the decoder unit and the combiner. The channel estimator and the radio frequency parts can be implemented by known methods.

The signal is applied to a detector from the combiner. In the detector, the symbols can be detected using known detection methods. For example, the Euclidean distance between the combined symbol estimates and any symbol states can be calculated or the a posteriori probabilities of the received symbols or bits can determined. In the latter case, information is required on the channel, and the information 334 is obtained from the channel estimator 326. The signal is applied from the detector 332 to a channel decoder 336 and further to other parts of the receiver. The means carrying out the measures of the invention can be implemented both in the transmitter and in the receiver by software by means of the processor and suitable software or with separate components or circuits.

The above was an example of a receiver. For example the calculation and use of channel estimates can be implemented in a variety of ways, as is apparent to a person skilled in the art. For example Le Goff S., Glavieux, A., Berrou C., *Turbo-encodes and high spectral density efficiency modulation*, IEEE Int. Conf SuperComm Proceedings ICC'94, 1994, vol. 2, p. 645 to 649, which is incorporated herein by reference, describes an example of decoding 8-PSK signals and calculating soft statistics. The above description also lacks symbol or bit interleaving and deinterleaving carried out both in the transmitter and the receiver. If desired, these may be implemented using known methods.

Although the invention is described above with reference to examples according to the accompanying drawings, it is apparent that the invention is not limited thereto, but can be modified in a variety of ways within the scope of the inventive idea disclosed in the attached claims.

What is claimed is:

1. A method of encoding a digital signal, the method comprising
   encoding symbols, composed of bits, to be transmitted in blocks of a given length,
   encoding each block into a given number of channel symbols to be transmitted over several separate channels and three or more transmit antenna paths, and
   performing the encoding so that the sum energy of channel symbols mapping at least one symbol in a block is higher than the sum energy of channel symbols mapping another symbol in the block.

2. A method as claimed in claim 1, where in at least one symbol in a block comprising a different number of bits than another symbol in the block.

3. A method as claimed in claim 1, where in at least one symbol in a block having a higher reliability than another symbol in the block.

4. A method as claimed in claim 2, where in at least one symbol in a block being modulated by a different method than another symbol in the block.

5. A method as claimed in claim 2, where in the symbols to be transmitted being composed of bits and some bits in the symbols having a higher data rate being previously known.

6. A method as claimed in claim 3, further comprising the step of subjecting the signal to encoded modulation before encoding into channel symbols.

7. A method as claimed in claim 1, where in signal encoding comprises negation and repetition of at least some symbols.

8. A method as claimed in claim 1, where in the symbols are subjected to linear conversion before encoding.

9. A method as claimed in claim 1, further comprising the step of selecting the symbol mapped by channel symbols which have sum energy of higher than that of the others, so that the transmission power of different transmit antenna paths is substantially equal at the same point of time.

10. A method as claimed in claim 4, further comprising the step of encoding some symbols by the QPSK and some by the 8-PSK methods.

11. A method as claimed in claim 4, further comprising the step of encoding some symbols by the QPSK and some by the 16-QAM methods.

12. A method as claimed in claim 4, further comprising the step of encoding some symbols by the QPSK and some by the 16-PSK methods.

13. A method as claimed in claim 4, further comprising the step of encoding some symbols by the 8-PSK and some by the 16-PSK methods.

14. A method as claimed in claim 4, further comprising the step of encoding some symbols by the 8-PSK and some by the 16-QAM methods.

15. A method as claimed in claim 1, where in there being n*m channel symbols, wherein n and m are positive integers.

16. A method as claimed in claim 15, where in n is the length of a block.

17. A method as claimed in claim 15, further comprising the step of depicting the channel symbols in the form of an rim matrix, wherein n is the number of columns and m is the number of rows.

18. A method as claimed in claim 17, further comprising the step of transmitting the channel symbols over m antennas divided into n timeslots.

19. A method as claimed in claim 17, further comprising the step of transmitting the channel symbols over m antennas divided into n frequencies.

20. A method as claimed in claim 17, further comprising the step of transmitting the channel symbols over m antennas multiplied with n spreading codes.

21. A method as claimed in claim 17, further comprising the step of transmitting the channel symbols over n antennas divided into m timeslots.

22. A method as claimed in claim 17, further comprising the step of transmitting the channel symbols over n antennas divided into m frequencies.

23. A method as claimed in claim 17, further comprising the step of transmitting the channel symbols over n antennas multiplied with m spreading codes.

24. A method as claimed in claim 1, further comprising the step of implementing the transmit antenna paths by means of three or more antenna beams and two or more antennas.

25. A method as claimed in claim 1, further comprising the step of implementing the transmit antenna paths by means of three or more antennas.

26. A transmitter comprising
    means for encoding symbols, composed of bits, to be transmitted in blocks of a given length,
    means for encoding each block into a given number of channel symbols to be transmitted over several separate channels,
    and at least three transmit antenna paths for transmitting the channel symbols,
    means for converting the symbols into a form in which the sum energy of channel symbols mapping at least one symbol in a block is higher than the sum energy of channel symbols mapping another symbol in the block.

27. A transmitter as claimed in claim 26, where in the transmitter comprises means for convening the symbols into a form in which at least one symbol in a block comprises a different number of bits than another symbol in the block.

28. A transmitter as claimed in claim 26, where in the transmitter comprises means for converting the symbols into a form in which at least one symbol in a block has a higher reliability than another symbol in the block.

29. A transmitter as claimed in claim 26, where in the transmitter comprises means for modulating at least one symbol in a block using a different method than is used for another symbol in the block.

30. A transmitter as claimed in claim 26, where in the transmitter comprises means for encoding the signal to be transmitted in such a way that the encoding comprises the negation and repetition of at least some symbols.

31. A transmitter as claimed in claim 26, where in the transmitter comprises means for subjecting the symbols to be transmitted to linear conversion before encoding.

32. A transmitter as claimed in claim 26, where in the transmitter comprises means for encoding the symbols of a block into n*m channel symbols, wherein n and m are positive integers.

33. A transmitter as claimed in claim 32, where in n is the length of a block.

34. A transmitter as claimed in claim 32, where in the channel symbols are depicted in the form of an nm matrix, wherein n is the number of columns and m is the number of rows.

35. A transmitter as claimed in claim 34, where in the channel symbols are transmitted over m antennas divided into n timeslots.

36. A transmitter as claimed in claim 34, where in the transmitter is arranged to transmit the channel symbols over m antennas divided into n timeslots.

37. A transmitter as claimed in claim 34, where in the transmitter is arranged to transmit the channel symbols over m antennas multiplied by n spreading codes.

38. A transmitter as claimed in claim 34, where in the transmitter is arranged to transmit the channel symbols over n antennas divided into m timeslots.

39. A transmitter as claimed in claim 34, where in the transmitter is arranged to transmit the channel symbols over n antennas divided into m frequencies.

40. A transmitter as claimed in claim 34, where in the transmitter is arranged to transmit the channel symbols over n antennas multiplied by m spreading codes.

41. A transmitter as claimed in claim 34, where in the transmitter comprises three or more antennas for implementing the transmit antenna paths.

42. A transmitter as claimed in claim 34, where in the transmitter comprises two or more antennas for implementing the transmit antenna paths by means of three or more antenna beams.

43. A receiver comprising a decoder, a combiner and a detector each operatively coupled to one another, the receiver being adapted to receive a signal in which symbols composed of bits are encoded in blocks of given lengths into a given number of channel symbols, where in a decoder, a combiner and a detector, are arranged to combine and detect a signal in which the sum energy of channel symbols mapping at least one symbol in a block is higher than the sum energy of channel symbols mapping another symbol in the block.

44. A receiver as claimed in claim 43, where in the receiver comprises a decoder, a combiner and a detector, arranged to combine and detect a signal in which at least one symbol in a block comprises a different number of bits than another symbol in the block.

45. A receiver as claimed in claim 43, where in the receiver comprises a decoder, a combiner and a detector, arranged to combine and detect a signal in which at least one symbol in a block has a higher reliability than another symbol in the block.

46. A method of transmission of a digital signal, the method comprising
    encoding symbols, composed of bits, to be transmitted in blocks of a given length,
    encoding each block into a given number of channel symbols to be transmitted over several separate channels and three or more transmit antenna paths,
    performing the encoding so that the sum energy of channel symbols mapping at least one symbol in a block is higher than the sum energy of channel symbols mapping another symbol in the block,
    transmitting a signal including the encoded channel symbols;
    receiving and decoding the signal including the encoded channel symbols.

47. A receiver comprising a decoder, a combiner and a detector each operatively coupled to one another, the receiver being adapted to receive a signal in which symbols composed of bits were encoded in blocks of given lengths into a given number of channel symbols, the encoding having been performed by means for encoding each block into a given number of channel symbols for transmission over several separate channels, the symbols having been converted into a form in which the sum energy of channel symbols mapping at least one symbol in a block is higher than the sum energy of channel symbols mapping another symbol in the block, wherein the decoder, combiner and detector, are arranged to combine and detect that the signal in which the sum energy of channel symbols mapping at least one symbol in a block is higher than the sum energy of channel symbols mapping another symbol in the block.

48. A system comprising:

a transmitter including means for encoding symbols, composed of bits, to be transmitted in blocks of a given length, means for encoding each block into a given number of channel symbols to be transmitted over several separate channels, and at least three transmit antenna paths for transmitting the channel symbols, and means for converting the symbols into a form in which the sum energy of channel symbols mapping at least one symbol in a block is higher than the sum energy of channel symbols mapping another symbol in the block; and a receiver including a decoder, a combiner and a detector each operatively coupled to one another, the receiver being adapted to receive a signal in which symbols composed of bits were encoded in blocks of given lengths into a given number of channel symbols, the encoding having been performed by the means for encoding in the transmitter, the symbols having been converted by the means for converting in the transmitter, wherein the decoder, combiner and detector, are arranged to combine and detect that the signal in which the sum energy of channel symbols mapping at least one symbol in a block is higher than the sum energy of channel symbols mapping another symbol in the block.

* * * * *